US010212894B2

(12) United States Patent
Buist et al.

(10) Patent No.: US 10,212,894 B2
(45) Date of Patent: Feb. 26, 2019

(54) MODULAR VEGETATED ROOF SYSTEM

(71) Applicants: Richard J. Buist, Burlington (CA); Walter A. Hermann, Pickering (CA)

(72) Inventors: Richard J. Buist, Burlington (CA); Walter A. Hermann, Pickering (CA)

(73) Assignees: BIOROOF SYSTEMS INC., Burlington, Ontario (CA); GREEN INNOVATIONS LTD., Pickering, Ontario (CA)

( * ) Notice: Subject to any disclaimer, the term of this patent is extended or adjusted under 35 U.S.C. 154(b) by 236 days.

(21) Appl. No.: 15/047,121

(22) Filed: Feb. 18, 2016

(65) Prior Publication Data
US 2016/0242363 A1    Aug. 25, 2016

Related U.S. Application Data

(63) Continuation of application No. 13/804,623, filed on Mar. 14, 2013, now Pat. No. 9,265,200.

(60) Provisional application No. 61/659,194, filed on Jun. 13, 2012.

(51) Int. Cl.
*A01G 9/02*     (2018.01)
*A01G 9/033*    (2018.01)

(52) U.S. Cl.
CPC ............. *A01G 9/033* (2018.02); *A01G 9/027* (2013.01); *Y02A 30/254* (2018.01); *Y02B 80/32* (2013.01)

(58) Field of Classification Search
CPC .......... A01G 9/02; A01G 1/007; A01G 9/104; A01G 9/0295; A01G 9/0297; A01G 9/033; A01G 20/00; A01G 9/027; E04D 11/002; Y02B 80/32; B65D 11/1866; B65D 11/1833; B65D 11/18
See application file for complete search history.

(56) References Cited

U.S. PATENT DOCUMENTS

| 1,557,712 A | 7/1924 | Little |
| 2,827,217 A | 3/1956 | Clement |
| 2,949,699 A | 6/1960 | Lapetina et al. |
| 3,919,163 A | 11/1975 | Clendinning et al. |

(Continued)

OTHER PUBLICATIONS

Live Roof Brochure—Prevegetated Modular Green Roof System, Feb. 2008.

*Primary Examiner* — Kathleen I Alker
(74) *Attorney, Agent, or Firm* — Bereskin & Parr LLP

(57) ABSTRACT

Described herein is a module for covering a surface with vegetation. The module comprises a drainage board having an upper surface for supporting a growth medium. The drainage board has a plurality of moisture receptacles extending downwardly from the upper surface for collecting moisture. The module also comprises a plurality of sidewalls having a multiplicity of apertures therethrough. Each sidewall is coupled to the drainage board and extends upwardly therefrom. The sidewalls cooperate with each other so as to provide a perimeter for surrounding the growth medium. The module may also include other features. For example, the sidewalls may be pivotally coupled to the drainage board (e.g. along a living hinge), the module may include couplers for securing adjacent modules together, the sidewalls may include a reinforcing rib, the drainage board may include an opening for receiving an irrigation nozzle therein, and there may be edging for covering the sidewalls.

18 Claims, 11 Drawing Sheets

(56) References Cited

U.S. PATENT DOCUMENTS

| | | | |
|---|---|---|---|
| 4,043,077 A | 8/1977 | Stonehocker | |
| 4,065,877 A * | 1/1978 | Kelley | A01G 9/0295 47/85 |
| 4,118,892 A * | 10/1978 | Nakamura | A01G 9/025 47/65.9 |
| 4,202,457 A * | 5/1980 | Tansi | H02G 3/081 174/53 |
| 4,858,781 A * | 8/1989 | Kane | B65F 1/062 220/23.83 |
| 5,315,786 A | 5/1994 | Smith et al. | |
| 5,419,080 A | 5/1995 | Buss et al. | |
| 5,437,698 A | 8/1995 | Furukawa | |
| 5,443,545 A * | 8/1995 | Weber | E01C 9/004 52/653.1 |
| 5,467,555 A * | 11/1995 | Ripley, Sr. | E01C 13/083 220/7 |
| 5,519,080 A | 5/1996 | Matsushita et al. | |
| 5,558,241 A * | 9/1996 | Huffstutler, Jr. | B65D 11/1833 220/1.5 |
| 5,581,936 A | 12/1996 | Belgiorno | |
| 5,595,021 A * | 1/1997 | Ripley, Sr. | E01C 13/083 47/66.5 |
| 5,673,513 A | 10/1997 | Casimaty | |
| 5,946,854 A | 9/1999 | Guillemain et al. | |
| 6,581,329 B1 | 6/2003 | Eriksson | |
| 6,606,823 B1 | 8/2003 | McDonough et al. | |
| 6,732,666 B2 | 5/2004 | Layt | |
| D501,051 S | 1/2005 | Yang et al. | |
| 6,862,842 B2 | 3/2005 | Mischo | |
| 7,334,376 B1 | 2/2008 | Behrens | |
| 7,392,616 B1 | 7/2008 | Bagby | |
| D587,821 S | 3/2009 | Larsen | |
| 7,596,906 B2 | 10/2009 | Gold | |
| 7,603,808 B2 * | 10/2009 | Carpenter | A01G 9/033 47/65.9 |
| 7,637,056 B2 * | 12/2009 | Tajima | A01G 9/00 47/65.9 |
| 7,726,071 B2 | 6/2010 | Carpenter | |
| 7,958,669 B2 | 6/2011 | Casimaty et al. | |
| 8,555,545 B2 * | 10/2013 | Fischer | E04D 11/002 47/65.9 |
| 9,565,809 B2 * | 2/2017 | Zhang | A61L 11/00 |
| 2002/0007592 A1 | 1/2002 | Mischo | |
| 2003/0075541 A1 * | 4/2003 | Bartasevich, Jr. | B65D 11/1833 220/6 |
| 2004/0074164 A1 | 4/2004 | Behrens | |
| 2004/0081771 A1 | 4/2004 | Waterford | |
| 2005/0044791 A1 | 3/2005 | Morandi et al. | |
| 2005/0102921 A1 | 5/2005 | Mischo | |
| 2005/0120645 A1 * | 6/2005 | Luckett | A01G 9/02 52/198 |
| 2005/0120656 A1 | 6/2005 | Luckett | |
| 2005/0155287 A1 | 7/2005 | Phillips | |
| 2007/0079547 A1 | 4/2007 | Gold | |
| 2007/0094927 A1 | 5/2007 | Perry | |
| 2007/0130828 A1 | 6/2007 | Mathy | |
| 2007/0193116 A1 | 8/2007 | Luckett et al. | |
| 2007/0261299 A1 | 11/2007 | Kephart | |
| 2008/0168710 A1 | 7/2008 | Mackenzie | |
| 2009/0260284 A1 | 10/2009 | Barbalho | |
| 2011/0030274 A1 | 2/2011 | Buist | |
| 2011/0197523 A1 * | 8/2011 | Dubner | E04D 11/002 52/173.1 |
| 2011/0289839 A1 | 12/2011 | Cronk et al. | |
| 2013/0239476 A1 * | 9/2013 | Meyer | A01G 9/033 47/65.9 |
| 2017/0215344 A1 * | 8/2017 | Meyer | A01G 9/033 |

* cited by examiner

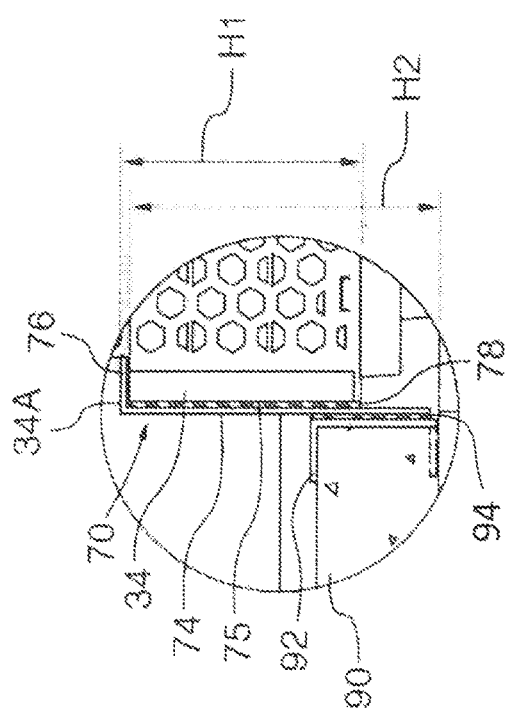
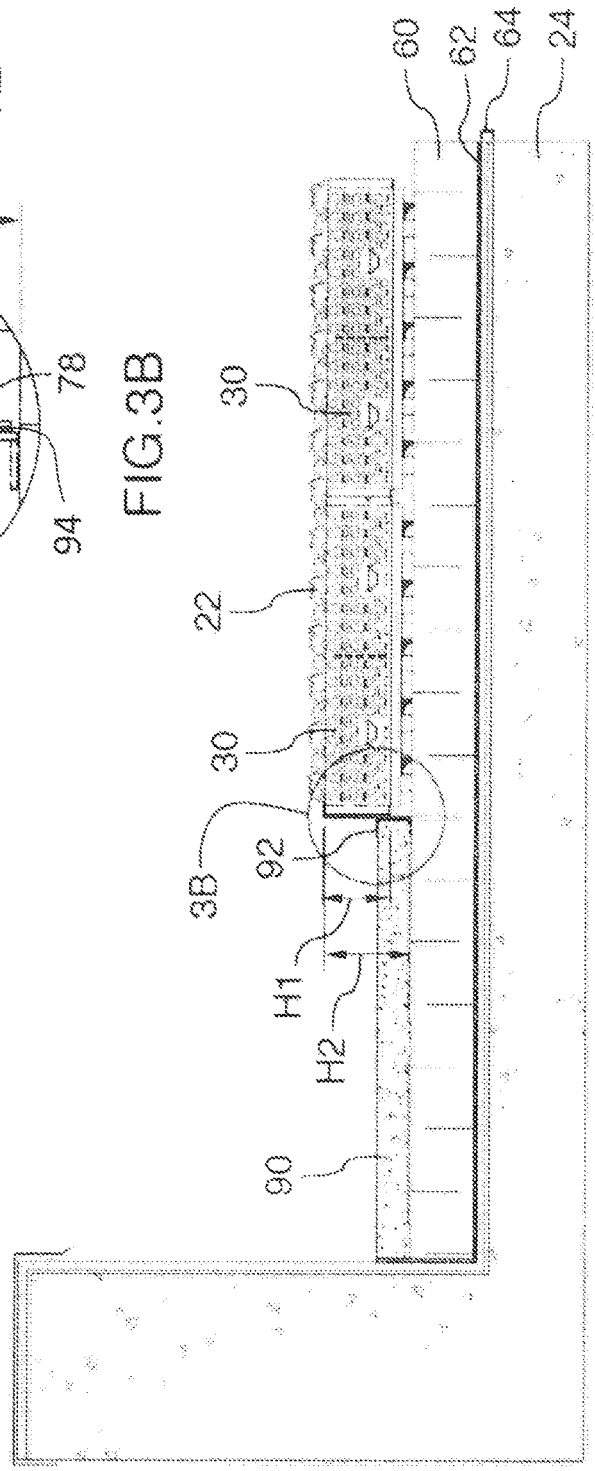
FIG.3B
FIG.3A

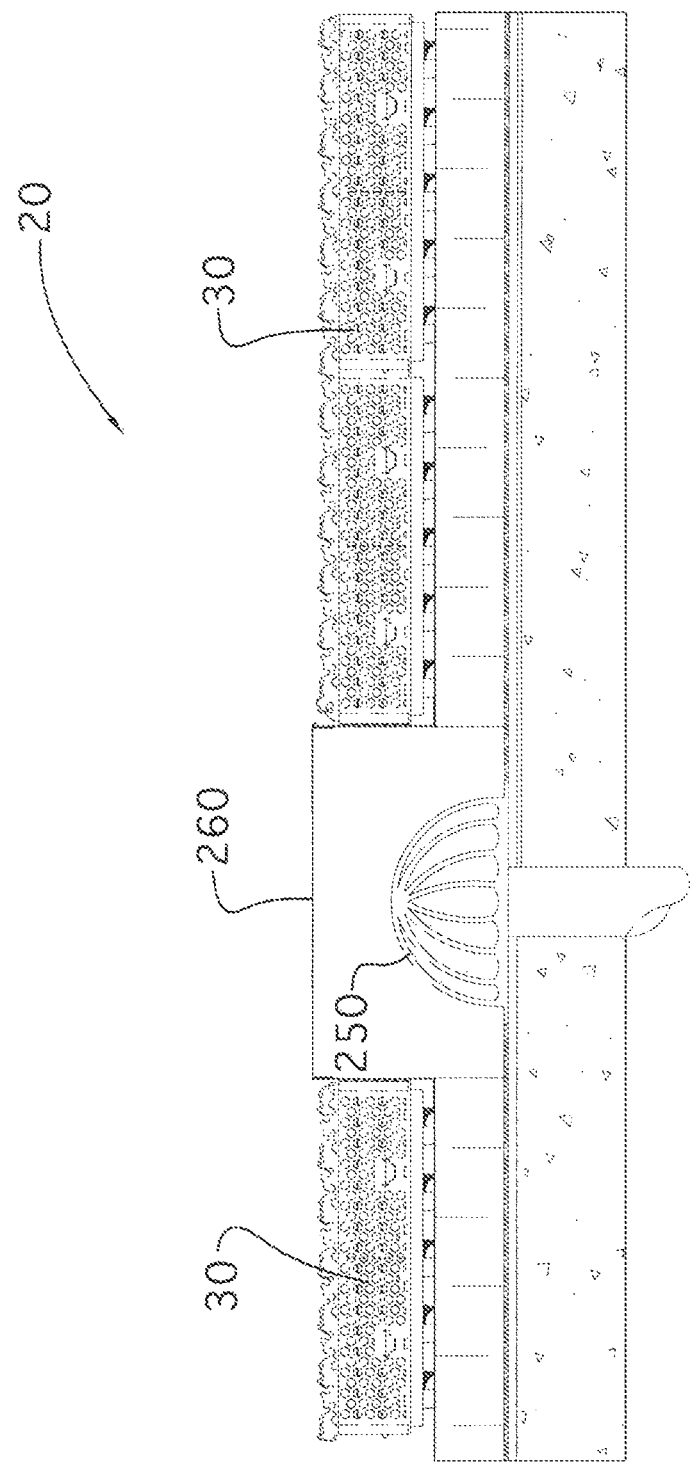

MODULAR VEGETATED ROOF SYSTEM

RELATED APPLICATIONS

This application is a continuation of U.S. patent application Ser. No. 13/804,623 filed on Mar. 3, 2013, by the present inventor(s), and entitled "MODULAR VEGETATED ROOF SYSTEM" which claims the benefit of U.S. Provisional Patent Application Ser. No. 61/659,194 filed on Jun. 13, 2012, by the present inventor(s), and entitled "MODULAR VEGETATED ROOF SYSTEM", the entire contents of which are hereby incorporated by reference herein for all purposes.

TECHNICAL FIELD

The disclosure herein relates generally to apparatus and systems for covering surfaces with vegetation and in particular, to modular systems for covering roofs with vegetation.

BACKGROUND

Green roof systems enable vegetation to grow on a roof of a building or another structure. Some of these systems include a waterproof membrane applied to the surface of the roof. A layer of soil or another growth medium is placed on top of the membrane along with seeds or vegetation, which then grow on the roof. Unfortunately, these systems often require customization for each particular roof design, which can be expensive and time consuming.

Some modular green roof systems are known. For example, U.S. Patent Application Publication No. US 2011/0030274 (Buist) discloses a green roof module for covering a portion of a roofing surface with vegetation. The module includes a tray for containing a growing medium and vegetation, a permeable membrane, and a drainage board. The tray has a biodegradable bottom and a plurality of upwardly extending biodegradable walls about the perimeter of the biodegradable bottom. The biodegradable bottom is configured so that water received within the tray can pass therethrough. The permeable membrane is provided below the biodegradable bottom, and is sized and shaped so as to span the biodegradable bottom and configured to allow water to pass therethrough while inhibiting the growing medium from passing therethrough. The drainage board is provided below the permeable membrane opposite the biodegradable bottom, and has an upper surface for supporting the biodegradable bottom. The drainage board is configured so that at least some of the water passing through the permeable membrane and received on the drainage board will be drained away from the tray. A plurality of the modules can be arranged to cover the surface.

In spite of these known systems, there is a need for improved modular systems for covering roofs and other surfaces with vegetation.

SUMMARY OF THE INVENTION

According to one aspect of the invention, there is a module for covering a surface with vegetation. The module comprises a drainage board having an upper surface for supporting a growth medium. The drainage board has a plurality of moisture receptacles extending downwardly from the upper surface for collecting moisture. The module also comprises a plurality of sidewalls having a multiplicity of apertures therethrough. Each sidewall is coupled to the drainage board and extends upwardly therefrom. The sidewalls cooperate with each other so as to provide a perimeter for surrounding the growth medium.

In some embodiments, the sidewalls may be pivotally coupled to the drainage board, for example, along a living hinge. Accordingly, each sidewall may be foldable along the living hinge to an upright position in which the sidewall extends upwardly from the upper surface of the drainage board to cooperate with adjacent sidewalls to provide a perimeter for surrounding the growth medium.

In some embodiments, the module may further comprise at least one female coupler on a first side of the module, and at least one male coupler located on a second side of the module. The male coupler may be configured to interlock with the female coupler of an adjacent module so as to positively secure the modules together.

In some embodiments, at least one of the sidewalk may have at least one rib for reinforcing the sidewall.

In some embodiments, the drainage board may include at least one opening through the upper surface. The opening may be sized and shaped to receive an irrigation nozzle therethrough.

In some embodiments, the module may be pad of a modular system for covering a surface with vegetation. The system may also include edging for covering at least one of the sidewalls. The edging may include a planar portion for covering at least some of the apertures through the at least one sidewall, and an upper flange projecting from the planar portion for overhanging an upper edge of the at least one sidewall.

Other aspects and features of the invention will become apparent, to those ordinarily skilled in the art, upon review of the following description of some exemplary embodiments.

BRIEF DESCRIPTION OF THE DRAWINGS

Some embodiments of the present specification now be described, by way of example only, with reference to the following drawings, in which:

FIG. 3A is a cross-sectional view of the system of FIG. 1 along the line 3A-3A; and FIG. 3B is an enlarged cross-sectional view of a portion of the system shown in FIG. 3A showing edging covering a sidewall of a module;

FIG. 10 is a cross sectional view of the layout of the modular system of FIG. 9 along the line 10-10.

DETAILED DESCRIPTION OF THE INVENTION

Figure 1:
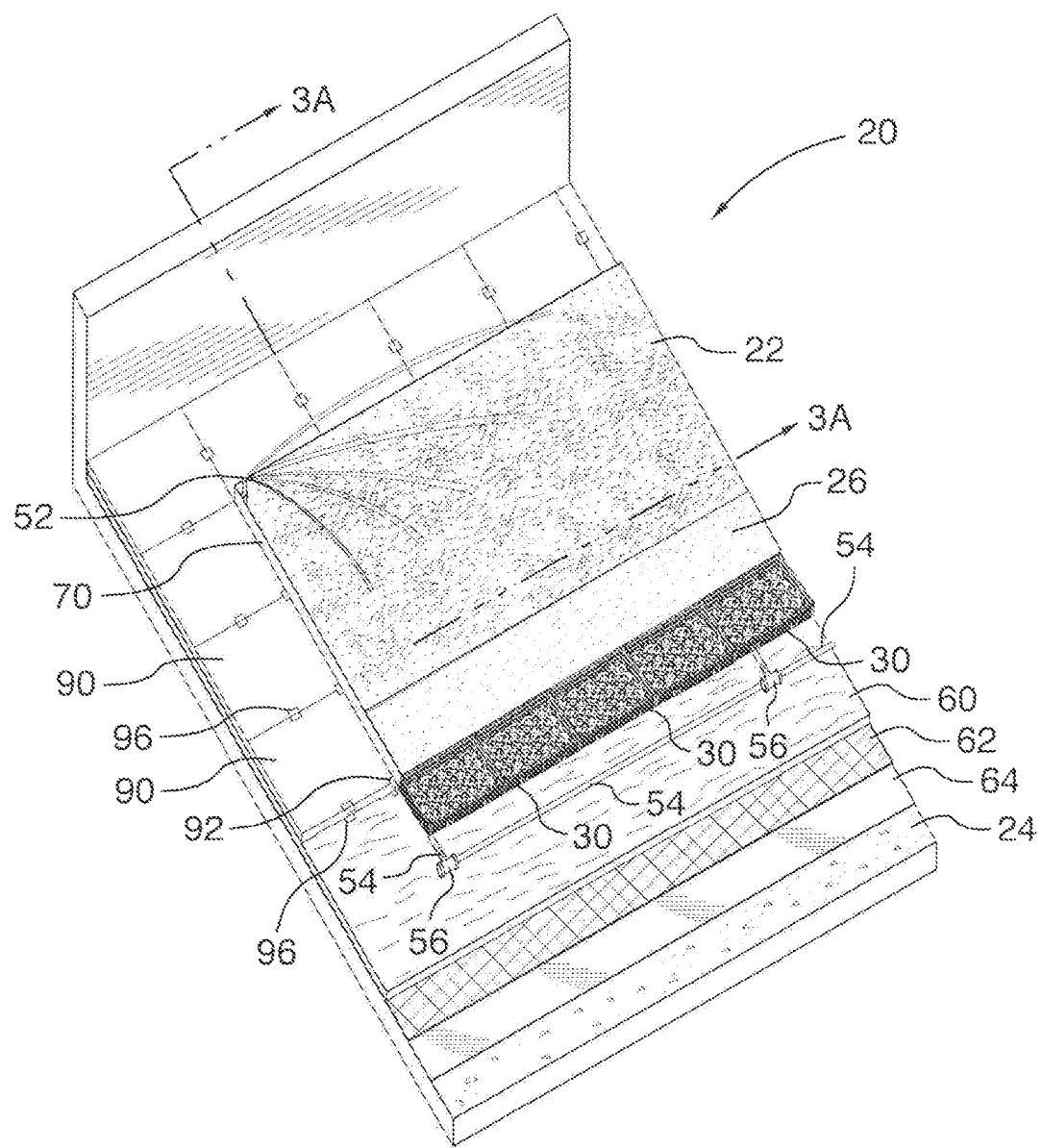
FIG. 1 is a perspective view of a modular system for covering a roof with vegetation according to an embodiment.
Figure 2:
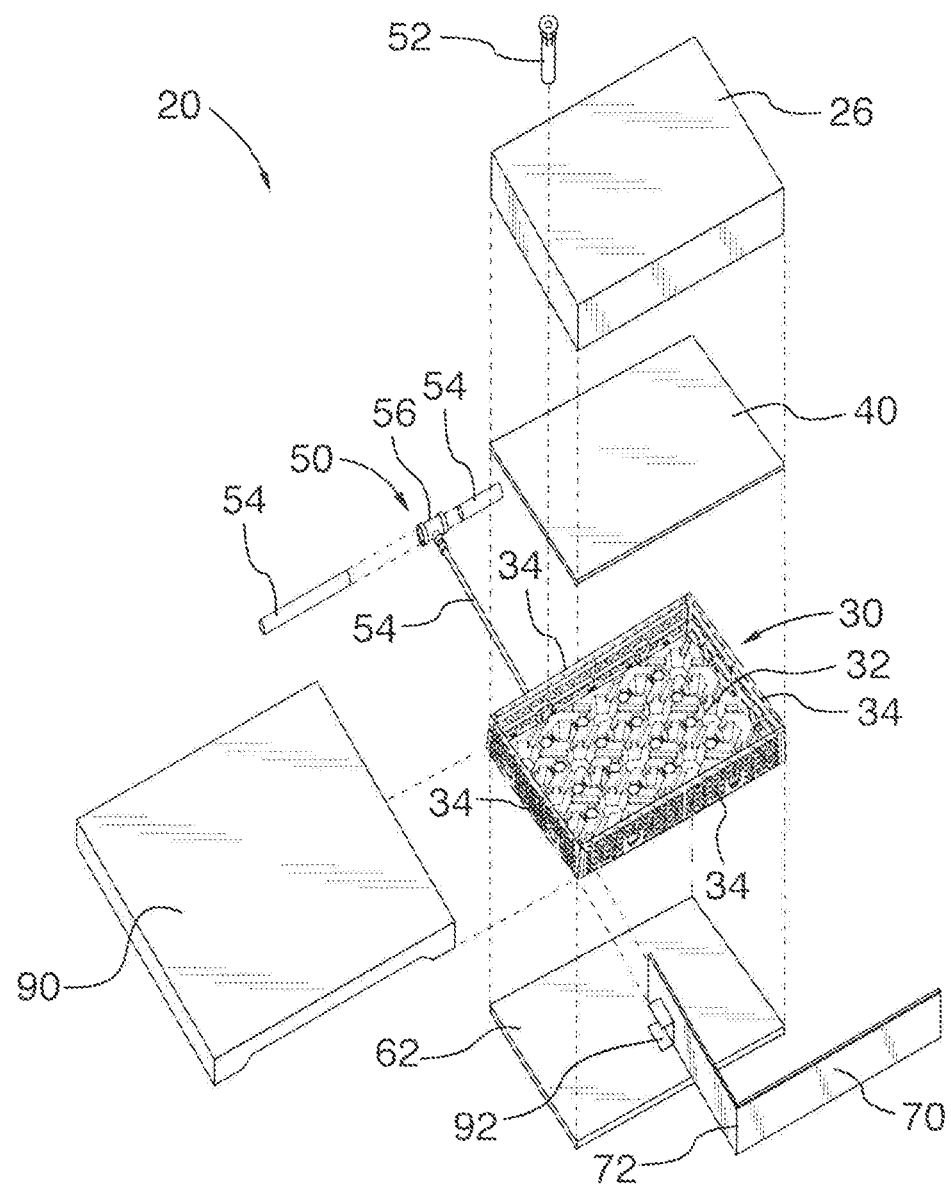
FIG. 2 is an exploded perspective view of some components of the modular system of FIG. 1.

Referring to FIGS. 1-3, illustrated therein is a modular vegetated roof system 20 for covering a surface with vegetation 22. For example, the system 20 may be used to cover a roof 24 with a variety of plants or other vegetation, which may grow in a growth medium 26 such as soil.

The vegetated roof system 20 includes one or more vegetated roof modules 30. The vegetated roof modules 30 are generally configured to support the growth medium 26. In some embodiments, the modules 30 may be supplied pre-vegetated. This may allow quick and easy installation of the modular vegetated roof system 20. In other embodiments, the modules 30 may be supplied without vegetation, for example, either empty, or with only the growth medium.

Referring to FIG. 2, each module 30 may include a drainage board 32 having an upper surface for supporting the growth medium 26, and sidewalls 34 coupled to the drainage board 32. The sidewalls 34 extend generally upward from the drainage board 32. The sidewalls 34 may cooperate with each other to provide a perimeter for surrounding the growth medium 26.

Referring again to FIG. 1, multiple modules 30 can be placed in a side-by-side arrangement to cover a surface larger than a single module 30. In some examples, each module 30 may have a shape that allows multiple modules to be joined together to cover a surface. For example, each module 30 may have a rectangular shape with four sidewalls 34. The module 30 may be approximately 20-inches long and 15-inches wide. In some embodiments, the modules 30 may have other shapes and sizes. For example, the modules 30 may be square, triangular, or another shape, or a combination thereof.

As shown, one or more of the sidewalls 34 have a multiplicity of apertures therethrough. The apertures can allow transfer of moisture, roots, soil, or other substances between adjacent modules 30. This may enhance growth and uniformity of the vegetation. While the illustrated embodiment shows hexagonal apertures, the apertures may be circular, square, or any other suitable shape.

Referring again to FIG. 2, a permeable membrane 40 may be placed between the upper surface of the drainage board 32 and the growth medium 26. The permeable membrane 40 may be a thin, flexible, porous membrane that allows water to pass therethrough, but which inhibits other materials from passing therethrough. For example, the permeable membrane 40 may be a filter fabric that allows water to flow through to the drainage board 32, but tends to inhibit soil, plants and other organic and non-organic materials from passing to the drainage board 32. As such the permeable membrane 40 may inhibit the drainage board 32 from becoming clogged by soil and other materials. In some embodiments, the permeable membrane 40 may be secured to the upper surface of the drainage board 32, for example, using adhesive.

The system 20 may also include an irrigation system 50 for supplying water to the modules 30. The irrigation system 50 may include one or more irrigation nozzles 52 that can be integrated into one or more of the modules 30. The nozzles 52 may be in fluid communication with a water supply (not shown). For example, the nozzles 52 may be connected to the water supply via one or more irrigation pipes or conduits 54, which may be interconnected by fluid connectors 56. The irrigation pipes may extend along passageways beneath the modules 30.

There may also be one or more layers of material below the modules 30. For example, as shown in FIG. 1, there may be an insulation layer 60, a root barrier 62, and a roof membrane 64. The root barrier 62 may be made from a three-ply sheet having a polyester corded grid between two sheets of polyethylene. Alternatively, the root barrier 62 may be a sheet of Thermoplastic PolyOlefin (TPO).

In some embodiments, there may be other types of layers, or one or more of the layers may be omitted. For example, only the root barrier 62 is shown in FIG. 2. In some examples, the root barrier 62 and the roof membrane 64 may be integrated into a single layer.

The system 20 may include edging 70 for covering one or more sidewalls 34 of one or more modules 30. The edging may be made from aluminium or other metals, plastics, or another suitable material.

As shown in FIG. 2, the edging 70 may be bent and may have one or more corners 72 that allow the edging 70 to wrap around adjacent sidewalls 34 of a module 30. In some embodiments, the edging 70 may extend for some length along multiple modules 30 arranged in a row (e.g. as shown in FIG. 1).

Referring to FIGS. 3A and 3B, the edging 70 may include a planar portion 74 for covering apertures through the sidewall(s) 34 of one or more modules 30. This may help to contain soil and other substances within the module 30.

In some embodiments, the planar portion 74 of the edging 70 may be secured to the sidewall(s) 34 using an adhesive 75. For example, the adhesive 75 may be tape, glue, epoxy, and the like. In some embodiments, the adhesive 75 may be a weather resistant double sided tape. This may allow easy installation of the edging 70.

The edging 70 may also include an upper flange 76 projecting from the planar portion 74. The upper flange 76 may overhang an upper edge 34A of the sidewall(s) 34. The overhang may help to contain soil and other substances within the module 30.

In some embodiments, the edging 70 may be raised above the surface being covered by the module 30. For example, with reference to FIG. 3B, the edging 70 generally has a bottom edge 78 and a first height H1 extends between the bottom edge 78 and the upper flange 76. The module 30 has a second height H2 extending between the upper edge 34A of the sidewall 34 and the bottom of the drainage board 32. Furthermore, the second height H2 of the module 30 may be greater than the first height H1 of the edging 70. As such, the bottom of the edging 70 may be spaced apart above the roof surface. This can help with drainage, for example, by allowing moisture to escape from underneath the module 30.

The modular system 20 may also include one or more slabs 90 for anchoring the modules 30 in place. As shown in FIG. 1, the slabs 90 may be placed around the periphery of the modules 30. The slabs 90 may be precast concrete paving stones or another suitable slab of material such as natural stone pavers.

Referring to FIGS. 1-3B, an anchor clip 92 may be used to help anchor the modules 30 using the slabs 90. For example, the anchor clip 92 may be configured to engage the module 30 and the slab 90 so that the slab 90 holds down the module 30. More particularly, the anchor clip 92 may have a C-shaped opening for receiving an edge of the slab 90. The anchor clips 92 may inhibit the modules 30 from being lifted off the roof, for example, in the event of windy conditions.

In some embodiments, the anchor clip 92 may indirectly engage the module 30. For example, as shown in FIG. 3B, the anchor clip 92 may be coupled to the edging 70, in which case the upper flange 76 may engage the upper edge 34A to hold down the module 30. The anchor clip 92 may be secured to the edging 70 using an adhesive 94 such as tape (e.g. a weather resistant double-sided tape), glue, epoxy, and the like. In other embodiments, the anchor clips 92 may directly engage the module 30, for example, by coupling the anchor clip directly to the module 30 (e.g. using tape).

In some embodiments, there may be secondary anchor clips 96 that interconnect adjacent slabs 90. The secondary anchor clips 90 may have an H-shaped cross-section so as to provide two opposed openings for engaging the edges of two adjacent slabs 90.

Figure 4:
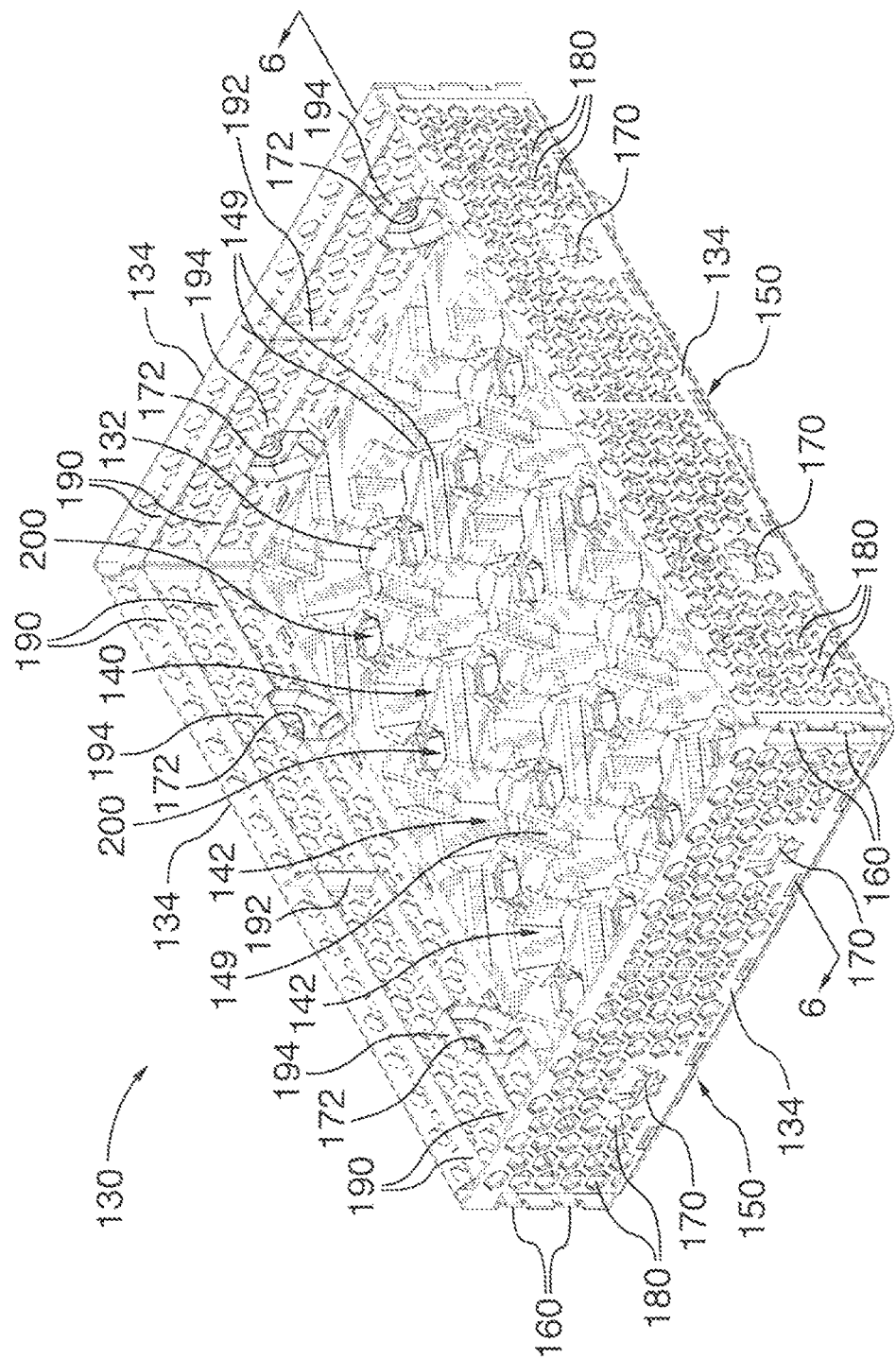
FIG. 4 is a perspective view of a module for covering a roof with vegetation according to an embodiment.
Figure 5:
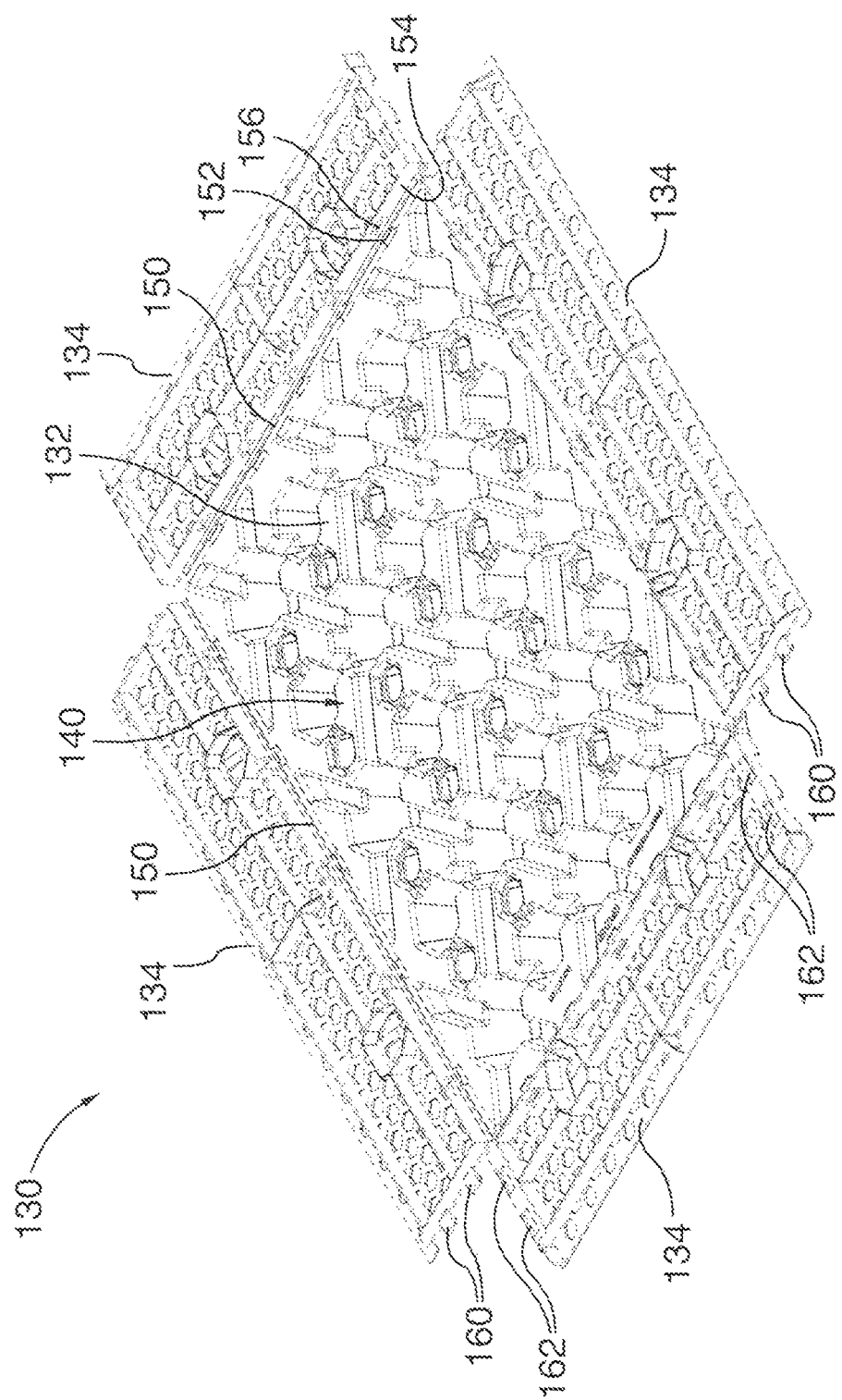
FIG. 5 is a perspective view of the module of FIG. 4 with sidewalls in an unfolded position.
Figure 6:
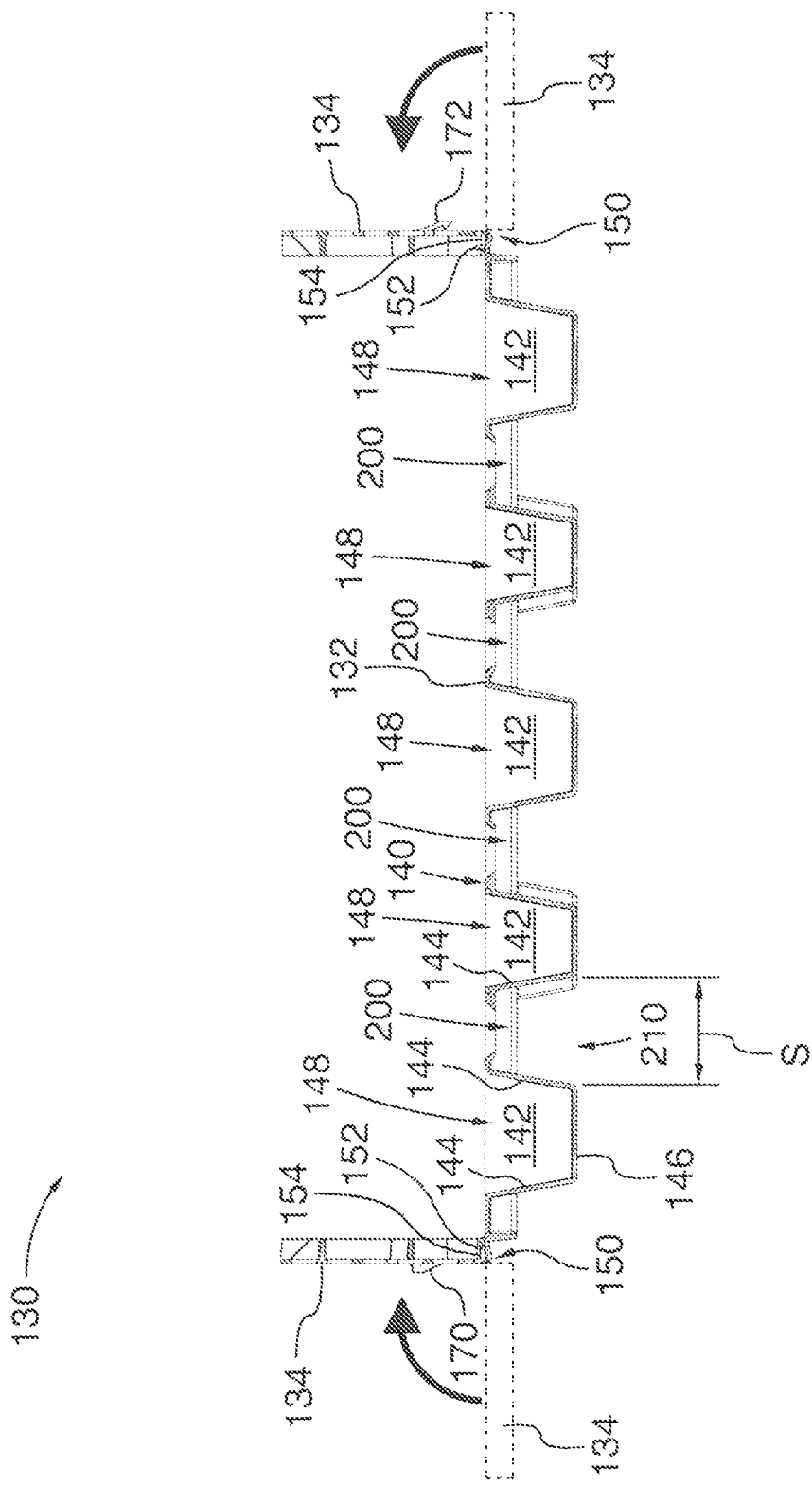
FIG. 6 is cross-sectional view of the module of FIG. 4 along the line 6-6.

Referring now to FIGS. 4-6, illustrated therein is a vegetated roof module 130 for covering a surface with vegetation. The module 130 may be used with the modular system 20 described above. Furthermore, the module 130 may be the same as or similar to the module 30 and similar elements are identified by similar reference numerals incremented by one hundred. For example, the module 130 includes a drainage board 132 and sidewalls 134.

The drainage board 132 generally has an upper surface 140. The upper surface 140 may support a growth medium such as soil. A filter fabric or another permeable membrane (e.g. permeable membrane 40) may be placed between the upper surface 140 and the growth medium. The permeable membrane is generally sized to fit between the sidewalls 134 and cover the upper surface 140. In some embodiments, the permeable membrane may be die cut.

The drainage board 132 also has one or more moisture receptacles 142 for collecting moisture. The moisture receptacles 142 extend generally downwardly from the upper surface 140. For example, as shown in FIG. 6, the moisture receptacles 142 may be defined by one or more exterior walls such as sidewalls 144 and a base wall 146. The receptacles 142 generally have an opening 148 along the upper surface 140. The opening 148 may allow moisture to pass into (and out of) the moisture receptacle 142.

In some embodiments, the moisture receptacles 142 may be interconnected by one or more fluid channels 149 (see FIG. 4). The fluid channels 149 extend generally downwardly from the upper surface 140 to a shallower depth than the moisture receptacles 142. Accordingly, when moisture or water in one moisture receptacle 142 rises up to the depth of the fluid channel 149, the water tends to flow along the channel 149 and into other moisture receptacles 142. This may help equalize and distribute water and moisture across the drainage board 132.

The sidewalls 134 of the module 130 are coupled to the drainage board 132. For example, as shown in FIGS. 5 and 6, each sidewall 134 is pivotally coupled to the drainage board 132 along a living hinge 150. The living hinge 150 is generally a thin flexible hinge made from the same material as the drainage board 32 and sidewalls 134. For example, the living hinge 150 may be a portion of material (interconnecting the drainage board 32 and sidewalls 134) that is thinned or partially cut to allow bending along the living hinge 150.

Each sidewall 134 is generally foldable about its respective living hinge 150. For example, as shown in FIG. 6, the sidewalls 134 can be moved between an unfolded or unassembled position (shown in dotted lines) and an assembled or upright position (shown in solid lines). Coupling the sidewalls 134 to the drainage board 132 using the living hinges 150 can allow the module 130 to be manufactured as a single unitary piece of homogenous material, such as a single piece of plastic.

With reference to FIG. 5, the sidewalls 134 may extend generally parallel with the drainage board 132 in the unassembled position. The module 130 may be initially manufactured and formed in this position. This is because it may be easier to manufacture the modules 130 as flat pieces with the sidewalls 134 folded down, especially when moulding the module from plastics, for example, using an injection moulding process. Furthermore, the flat unassembled position may enable compact storage and transportation of the modules 130, which may help reduce distribution costs.

Once the module 130 has been manufactured and is ready for installation, the sidewalls 134 can be moved to the upright position as shown in FIG. 4. In the upright position, the sidewalls 134 extend generally upwardly from the upper surface 140 of the drainage board 132. For example, the sidewalls 134 may be generally perpendicular to the upper surface 140. Once in the upright position, the sidewalls 134 may cooperate with adjacent sidewalls to provide a perimeter for surrounding and supporting the growth medium.

In some embodiments, the sidewalls 134 may be held in the upright position using one or more connectors. For example, with reference to FIG. 6, there may be one or more snap fittings 152 extending upwardly from the drainage board 132 along the periphery thereof. Furthermore, the sidewalls 134 may have a lower flange 154 adjacent the living hinge 150. The snap fittings 152 may be configured to engage the lower flange 154 when the sidewalls 134 are in the upright position. More particularly, as shown in FIG. 5, the lower flange 154 may have a plurality of openings 156 for receiving the snap fittings 152 therethrough. This may allow a hp on the snap fittings 152 to engage a portion of the lower flange 154.

In some embodiments, the lower flange 154 may help retain the permeable membrane (e.g. the filter fabric) in place. For example, the filter fabric may be die cut or otherwise sized to span the extent of the upper surface 140 of the drainage board 132 such that the lower flange 154 overlaps the filter fabric when the sidewall 134 is in the upright position. Accordingly, when the sidewall 134 is moved to the upright position, the filter fabric may be secured or pinched between the lower flange 154 and the upper surface 140 of the drainage board 132.

The sidewalls 134 may also be interconnected with each other once moved to the upright position. For example, as shown in FIG. 5, some sidewalls 134 may include connectors such as locking tabs 160, which may cooperate with slots 162 in adjacent sidewalls 134 to interconnect the sidewalls 134. More particularly, when moving the sidewalls 134 to the upright position, the locking tabs 160 of one sidewall 134 may pass through the slots 162 of an adjacent sidewall 134. The locking tabs 160 may then engage or latch onto the adjacent sidewall 134 so as to interlock the sidewalls 134. Interlocking the sidewalls 134 may help hold the sidewalls in the upright position.

While the illustrated embodiment includes two types of connectors for holding the sidewalls 134 in the upright position, in some embodiments the sidewalls 134 may be held in the upright using one or more types of connectors. For example, the module 130 may include only the locking tabs 160 and slots 162 (and not the snap fittings 152). Alternatively, the module may utilize other types of connectors than those described heroin.

While the illustrated embodiment utilizes a living hinge 150 to couple the sidewalls 134 to the drainage board 132, in other embodiments the sidewalls 134 could be coupled to the drainage board 132 using other techniques. For example, the drainage board 132 could be manufactured separately from the sidewalls 134. The separate pieces could then be assembled by coupling the sidewalls 134 to the drainage board 132, for example, using hinge pins, snap fittings, other fasteners, or other fastening techniques.

Furthermore, while the module 130 may be made from plastic, in some embodiments, the module 130 may be made from other materials such as metals, composites, and the like.

As described previously, it may be desirable to place multiple modules 130 in a side-by-side arrangement to cover a surface larger than a single module 130. In such cases, it is desirable to interlock the modules 130 with each other. Accordingly, each module 130 may include couplers for coupling the modules 130 together, as will be described below.

Referring to FIGS. 4 and 6, each module 130 may include one or more female couplers 170 on a first side of the module 130, and one or more male couplers 172 on a second side of the module 130. The male couplers 172 are generally configured to interlock with the female couplers 170 of an adjacent module to positively secure the modules together.

As shown in FIG. 4, there may be two female couplers 170 located on each of two adjacent sidewalls 134, and there may be two male couplers 172 located on each of the two opposing sidewalls 134. Providing male couplers 172 on opposite sidewalls of those with female couplers 170 allows multiple modules to be secured together in a row or matrix.

Figure 7A:
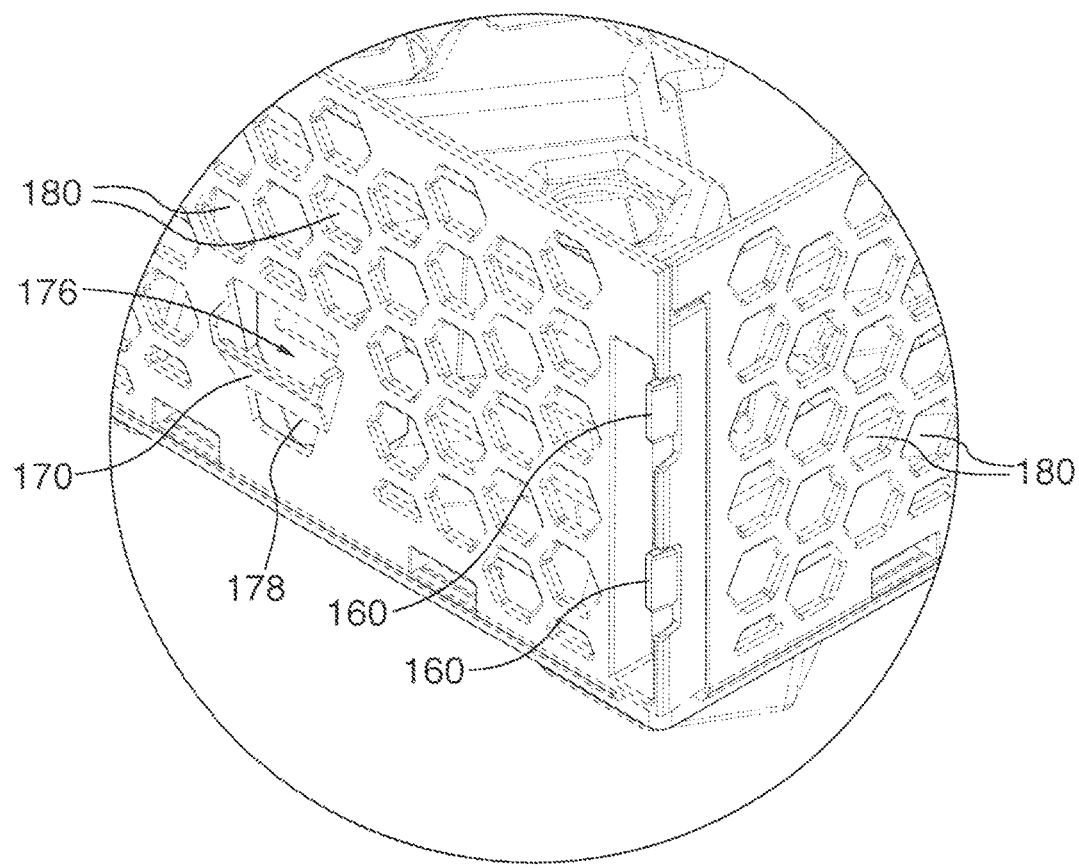
FIG. 7A is an enlarged perspective view of the module of FIG. 4 showing a female coupler having a slot.
Figure 7B:
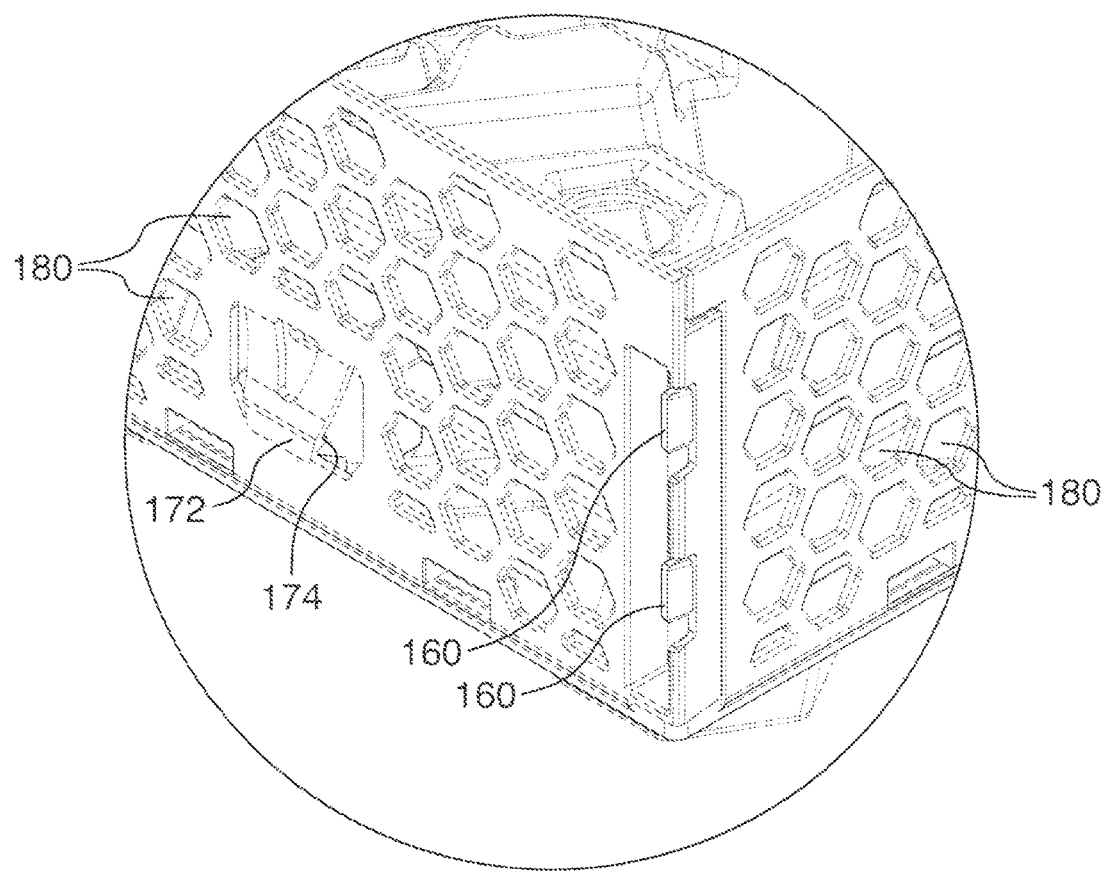
FIG. 7B is an enlarged perspective view of the module of FIG. 4 showing a male coupler having a locking tab for connection with the female coupler of an adjacent module.

Referring now to FIGS. 7A and 7B, an exemplary embodiment of the couplers 170, 172 will be deserted in more detail. As shown in FIG. 7B, the male coupler 172 may have a locking tab 174. As shown in FIG. 7A, the female coupler 170 may have a slot 176 for receiving the locking tab 174 of an adjacent module therethrough so as to secure the adjacent modules together. The male coupler 172 positively engages the female coupler 170. For example, the locking tab 174 may be resiliently biased towards the sidewall 134. Furthermore, the female coupler 170 has a mating surface 178 adjacent the slot 176 (e.g. on the underside of the female coupler 170). Inserting the locking tab 174 into the slot 176 pulls the locking tab 174 outward against the biasing force until the locking tab 174 passes over the mating surface. At that point, the locking tab 174 snaps back towards the sidewall 134 and positively engages the mating surface 178 to interlock the modules and inhibit detachment thereof.

In other embodiments, the male and female couplers may have other configurations such as other snap fittings or tongue-in-groove connections.

As shown in the illustrated embodiment, one or more of the sidewalls 134 have a multiplicity of apertures 180 therethrough. Furthermore, the couplers 170, 172 may be positioned on the modules 130 so that the apertures 180 align between adjacent modules. This may allow transfer of moisture, roots, soil, or other substances between the adjacent modules.

As shown, the apertures 180 may be aligned in rows and columns along the sidewall. This may help facilitate alignment of the apertures between adjacent modules.

As shown, some of the apertures 180 may be located proximal to the bottom of the sidewall 134 (e.g. adjacent the living hinge 150). For example, some of the apertures 180 may be located within less than about ⅛-inch of the upper surface 140 of the drainage board 132. Providing some apertures 180 near the bottom of the sidewall 134 may help facilitate transfer of water or moisture between adjacent modules.

In some embodiments, the apertures 180 may be sized and shaped to allow migration of roots therethrough. For example, as shown, the apertures 180 may have a generally hexagonal shape. Furthermore, each of the six sides of the hexagonal apertures may have a length of between about ⅛-inch to about ½-inch, or more particularly about ¼-inch. In other embodiments, the sides may be longer or shorter, and the apertures 180 may have other shapes such as square, circular, and the like.

In some embodiments, the area of each aperture 180 may be between about 0.01-square-inches and about 1-square-inch, or more particularly, about 0.2-square-inches. In other embodiments, the area of the apertures 180 may be smaller or larger.

Referring again to FIG. 4, in some embodiments, one or more of the sidewalls 134 may be reinforced. Foy there may be one or more reinforcements coupled to each sidewall 134. The reinforcements may include horizontal ribs 190, a vertical rib 192, and hexagonal shaped reinforcing ribs 194.

The horizontal ribs 190 may extend generally parallel to the upper surface 140 of the drainage hoard (e.g. across the length of the sidewall 134). The vertical rib 192 may extend generally perpendicular to the upper surface 140 (e.g. along the width of the sidewall). The hexagonal shaped reinforcing ribs 194 may be located around the male and female couplers 170, 172.

Use of the reinforcements may enhance the strength of the sidewalls 134. Enhancing the strength may be particularly useful when the sidewalls 134 have apertures 180 therethrough.

The reinforcements may be integrally formed with each respective sidewall 134. Alternatively, the reinforcements may be joined to the sidewall 134 separately, for example, by adhesive, ultrasonic welding, and the like.

Referring to FIGS. 4 and 6, the module 130 may be configured to be integrated with an irrigation system (such as the irrigation system 50 described above). For example, the drainage board 132 may include one or more openings 200 through the upper surface 140. Each opening 200 may be sized and shaped to receive an irrigation nozzle therethrough (such as the irrigation nozzle 52). As an example, each opening 200 may have a circular shape and may be sized to receive a standard sized irrigation nozzle therethrough. In some embodiments, the opening 200 may have a diameter of between about ½-inch and 1.5-inches, or more particularly, about ⅞-inch. In other embodiments, the diameter of the openings 200 may be larger or smaller, and the openings 200 may have other shapes.

The module 130 may also have one or more passageways, which may be used to supply water to the irrigation nozzle(s). For example, as shown in FIG. 6, the irrigation passageways may be open channels 210 on the underside of the drainage board 132. The open channels 210 may be sized and shaped to receive irrigation pipes or conduits therethrough.

The open channels 210 may be defined by spaces between the exterior walls of the moisture receptacles 142. More particularly, the spacing S between the sidewalls 144 of adjacent moisture receptacles 142 may be selected to receive irrigation pipes or conduits therethrough. For example, the spacing S may be between about 1-inch and about 3-inches, or more particularly, about 2-inches. In other embodiments, the spacing S may be larger or smaller.

As shown in FIG. 6, the openings 200 through the upper surface 140 may be aligned with the channels 210. This may allow easy routing of irrigation conduits to the irrigation nozzles.

Figure 8:
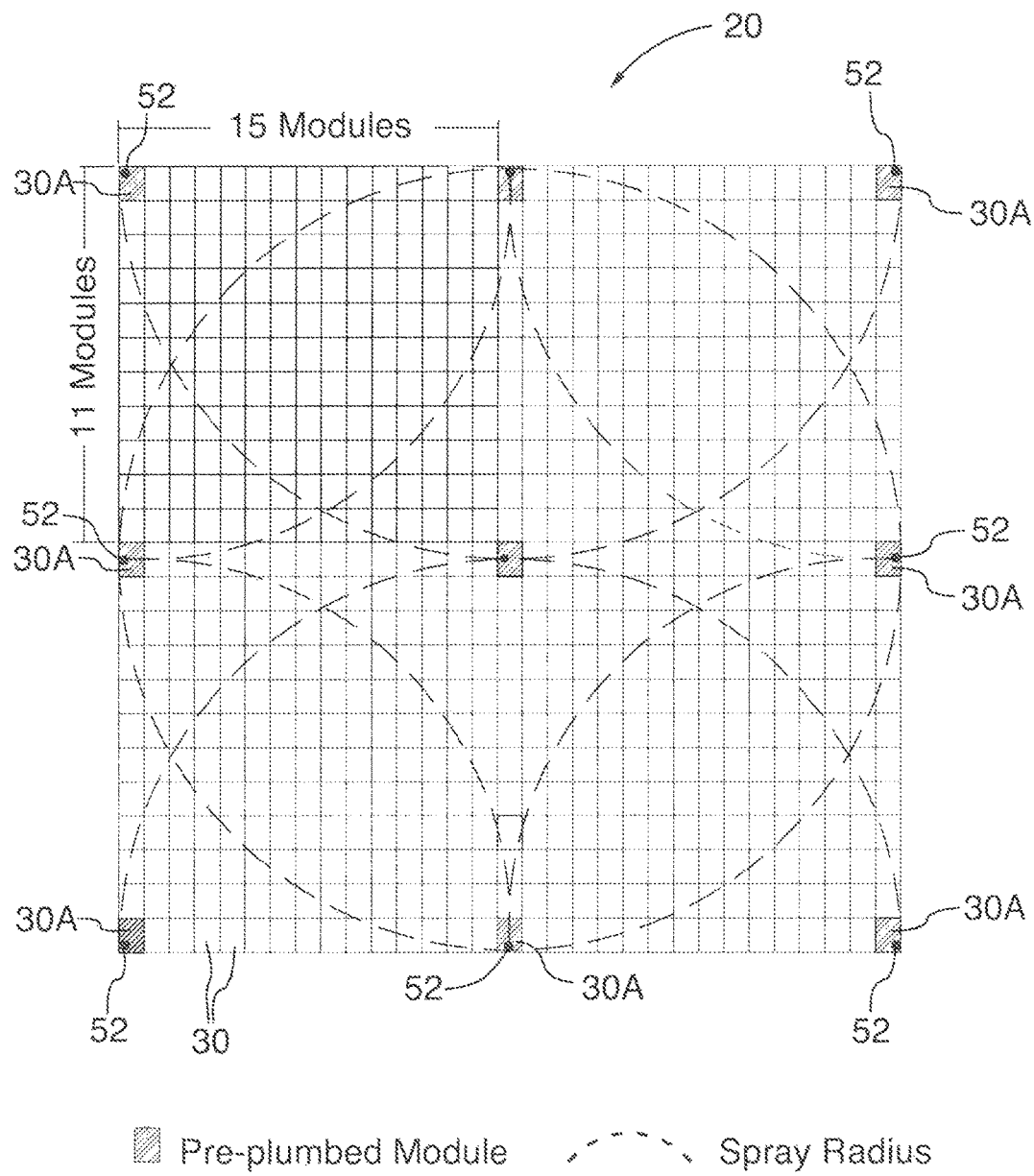
FIG. 8 is a top plan view of an exemplary layout of the modular system of FIG. 1, in which the modules are deployed with an irrigation system for supplying water in a selected spray pattern.

Referring now to FIG. 8, illustrated therein is an exemplary layout of the modular vegetated roof system 20 deployed on a roof top. The system 20 includes vegetated roof modules 30, 30A and an irrigation system. As shown, some of the modules 30A may be plumbed with one or more irrigation nozzles 52 ("plumbed modules"), while other modules 30 may not have irrigation nozzles. The arrangement of the plumbed modules 30A may be selected to provide a selected spray pattern, for example, as indicated by the spray radius of the nozzles 52 shown in FIG. 8. For example, the modules 30, 30A may be arranged so that there is one plumbed module 30A after every fifteen unplumbed modules 30.

The location of the irrigation nozzle 52 in each of the plumed modules 30A may be selected to provide a selected spray pattern or coverage area. For example, the irrigation nozzle 52 in the lower left plumbed module 30A may be placed in the lower left corner of the module. This may allow the irrigation nozzle 52 to spray water over an area that includes a substantial portion of the lower left plumbed module 30A itself.

Depending on the placement of a plumbed module 30A, the nozzle 52 may be provided with different watering paths. For example, the nozzles of the plumbed modules 30A in the corners may have a 90-degree watering path, the nozzles of the plumbed modules 30A along the edges may have a 180-degree watering path, and the nozzle of the plumbed module 30A in the centre may have a 360-degree watering path.

Figure 9:
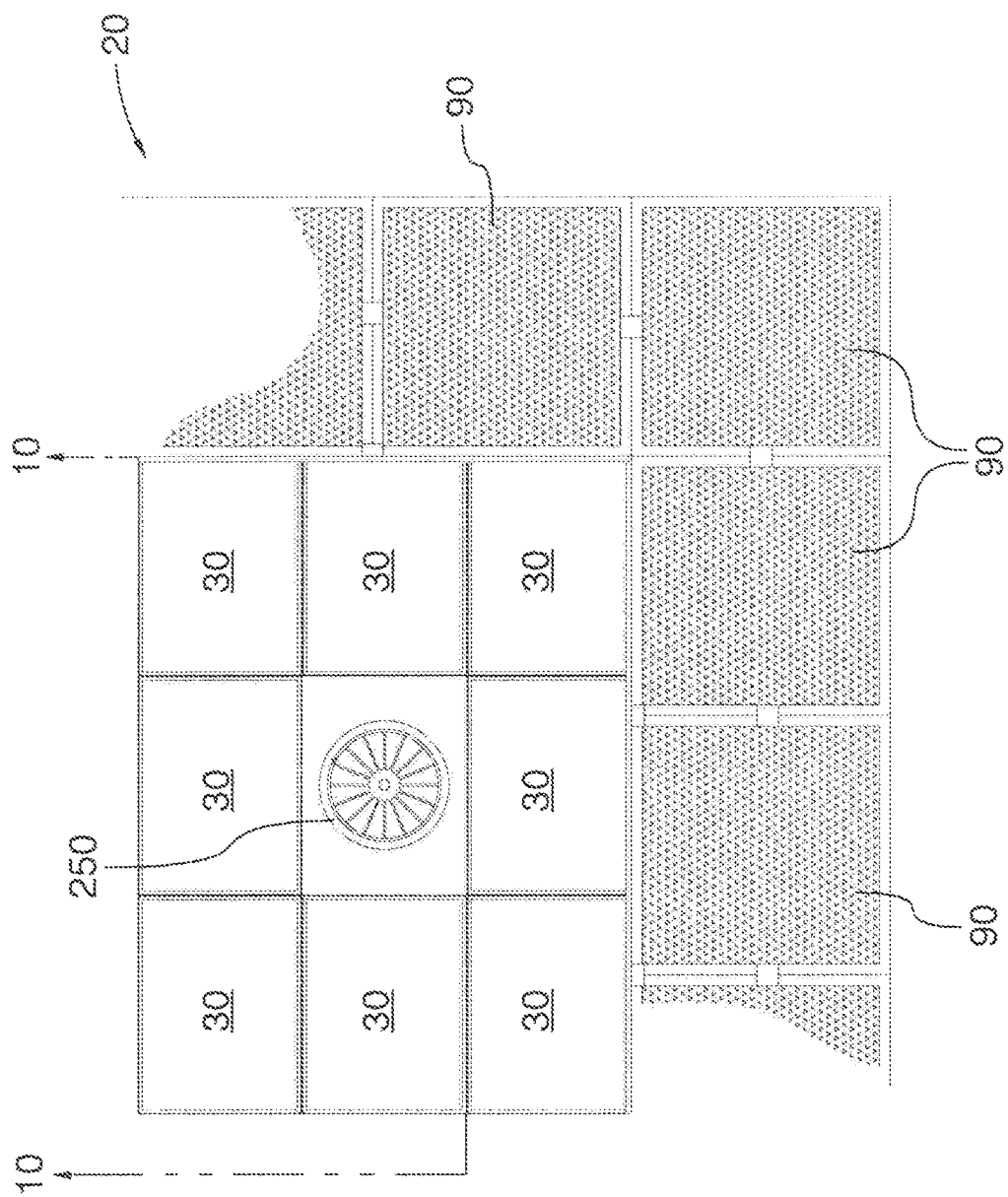
FIG. 9 is a top plan view of another exemplary layout of the modular system of FIG. 1, in which the modules are deployed around a roof drain.

Referring now to FIGS. 9 and 10, therein is another exemplary layout of the modular vegetated roof system 20 deployed on a rooftop around a roof drain 250. As shown, the modules 30 may be arranged to surround the roof drain 250. More specifically, one or more modules in a grid may be omitted to make room for the roof drain 250. In some cases, the modules 30 may be arranged so that the roof drain 250 is centred between adjacent modules 30. Furthermore, as shown in FIG. 10, the modules 30 may support a removable cover 260 for covering the roof drain 250.

In some embodiments, the modules 30, 130 described herein may be pre-vegetated with plants or other vegetation in the growth medium. For example, the vegetation may include a variety of plants such as Aruba Creeping Red Fescue, Marco Polo Sheep's Fescue, J-5 Chewings Fescue, Common Chives, Ozark Sundrops, Common Yarrow, and America Sea Pink (collectively referred to as "Shortgrass Meadow Plantings"). As another example, the vegetation could include another mixture of vegetation such as Sedum album "Orange Ice", Sedum acre "Aureum", Sedum album "Coral Carpet", Sedum floriferum "Weihenstephaner Gold" Sedum reflexum "Blue Spruce", Sedum spurium "Tricolour", Sedum spurium "Green Mantle" Sedum spurium "John Creech" Sedum spurium "Red Carpet", Sedum spurium "Summer Glory" and Sedum Rupestre "Angelina" (collectively referred to as "Desert Succulent Plantings"). Alternatively, the modules 30, 130 could be supplied without vegetation, for example, either empty, or with only the growth medium.

While the embodiments described herein relate to covering a portion of a roof surface with vegetation, it should be understood that other surfaces could be covered, including horizontal or angled surfaces that form part of a building or other structure, including patios, terraces, porches, decks, trusses and ledges.

While the above description provides examples of one or more apparatus, methods, or systems, it will be appreciated that other apparatus, methods, or systems may be within the scope of the appended claims.

The invention claimed is:

1. A modular system for covering a surface with vegetation, the modular system comprising a plurality of modules, each of the modules comprising:
   (a) a drainage board having an upper surface for supporting a growth medium, the drainage board having a plurality of moisture receptacles extending downwardly from the upper surface for collecting moisture;
   (b) a plurality of sidewalls having a multiplicity of apertures therethrough, each sidewall being coupled to the drainage board and extending upwardly therefrom, the sidewalls cooperating with each other so as to provide a perimeter for surrounding the growth medium; and
   (c) a plurality of couplers for positively securing adjacent modules together, the couplers being located on the sidewalls above the drainage board; the couplers including
      at least one female coupler located on a first sidewall of the plurality of sidewalls of each of the modules, the female coupler extending outwardly from the first sidewall; and
      at least one male coupler located on a second sidewall of the plurality of sidewalls of each of the modules, the male coupler having a locking tab resiliently biased towards the second sidewall and configured to interlock with the female coupler of an adjacent one of the plurality of modules so as to positively secure the modules together.

2. The modular system of claim 1, wherein the at least one female coupler has a slot for receiving the locking tab therethrough.

3. The modular system of claim 2, wherein the female coupler has a mating surface adjacent the slot for positively engaging the locking tab by snap fitting the locking tab on the mating surface so as to inhibit removal of the locking tab from the slot.

4. The modular system of claim 1, wherein the at least one female coupler comprises a pair of female couplers, and wherein the at least one male couplers comprises a pair of male couplers.

5. The modular system of claim 4, wherein the pair of female couplers are located on adjacent sidewalls of the plurality of sidewalls of each of the modules, and wherein the pair of male couplers are located on adjacent sidewalls of the plurality of sidewalls of each of the modules.

6. The modular system of claim 1, wherein the multiplicity of apertures are arranged in rows and columns, and wherein the plurality of couplers are located above at least one of the rows of apertures.

7. The modular system of claim 1, wherein each of the plurality of sidewalls is pivotally coupled to the drainage board along a living hinge.

8. The modular system of claim 7, wherein the drainage board and the sidewalls of each of the modules are formed as a single unitary piece of homogenous material.

9. The modular system of claim 8, wherein the drainage board and each of the sidewalls of each of the modules include at least one connector for holding the sidewalls in an upright position.

10. The modular system of claim 9, wherein the connectors comprise a plurality of snap fittings spaced along a periphery of the drainage board and extending upwardly therefrom, and a plurality of openings in the plurality of sidewalls sized to receive the plurality of snap fittings.

11. The modular system of claim 9, wherein the connectors comprise edge connectors for connecting edges of adjacent sidewalls of the plurality of sidewalls together and forming corners of the module when the plurality of sidewalls are in an upright position.

12. The modular system of claim 11, wherein the edge connectors include a locking tab and a slot.

13. The modular system of claim 1, further comprising a permeable membrane sized to fit between the plurality of sidewalls and cover the upper surface.

14. The modular system of claim 1, wherein the multiplicity of apertures are sized and positioned so as to allow for transfer of moisture through the growth medium and between adjacent modules of the plurality of modules.

15. The modular system of claim 1, further comprising edging for covering at least one of the plurality of sidewalls, the edging including:
(a) a planar portion for covering at least some of the multiplicity of apertures through the at least one sidewall, and
(b) an upper flange projecting from the planar portion for overhanging an upper edge of the at least one sidewall.

16. The modular system of claim 15, wherein the edging has a bottom edge and a first height extending between the bottom edge and the upper flange, and wherein the module has a second height extending between the upper edge of the at least one sidewall and a bottom of the drainage board, the second height being greater than the first height.

17. The modular system of claim 15, further comprising an anchor clip coupled to the edging, the anchor clip configured to engage a slab for anchoring the module.

18. The modular system of claim 17, wherein the anchor clip has a C-shaped opening for receiving an edge of the slab.

* * * * *